United States Patent [19]
Birk et al.

[11] Patent Number: 5,399,119
[45] Date of Patent: Mar. 21, 1995

[54] AIR VALVE DEVICE HAVING FLUSH CLOSING NOZZLE

[75] Inventors: Brian L. Birk, Huntington Beach; Michael T. Towey, Corona DelMar, both of Calif.

[73] Assignee: Puritan-Bennett Corporation, Overland Park, Kans.

[21] Appl. No.: 103,986

[22] Filed: Aug. 10, 1993

[51] Int. Cl.$^6$ .............................................. B60H 1/34
[52] U.S. Cl. ........................................ 454/76; 454/286; 454/334
[58] Field of Search ............. 454/76, 154, 286, 323, 454/334

[56] References Cited

U.S. PATENT DOCUMENTS

| | | | |
|---|---|---|---|
| 1,748,863 | 2/1930 | Burke | 454/334 X |
| 2,232,573 | 2/1941 | Teves | 454/286 |
| 2,596,909 | 5/1952 | Mufich et al. | |

FOREIGN PATENT DOCUMENTS

| | | | |
|---|---|---|---|
| 44285 | 6/1971 | Finland | 454/323 |
| 3626790 | 2/1988 | Germany | 454/76 |

*Primary Examiner*—Harold Joyce
*Attorney, Agent, or Firm*—Hovey, Williams, Timmons & Collins

[57] ABSTRACT

A ventilation air valve assembly (10) for use in aircraft or similar contexts is provided which may be selectively opened and oriented for directing desired quantities of ventilation air in desired directions. The valve assembly (10) includes a tubular valve body (12) presenting an apertured, flattened lowermost end wall (40) together with an internal valve member (14) in the form of an elongated shank having a bottom surface (46) and a marginal sealing surface (48). In the valve-closed position of the assembly (10), the sealing surface (48) engages a correspondingly configured internal surface of the body (12) in order to prevent air flow through the body (12). Moreover, in the valve-closed position, the lower surface of the valve assembly (10) is flat, essentially flush, and presents no dirt-collecting recesses.

6 Claims, 2 Drawing Sheets

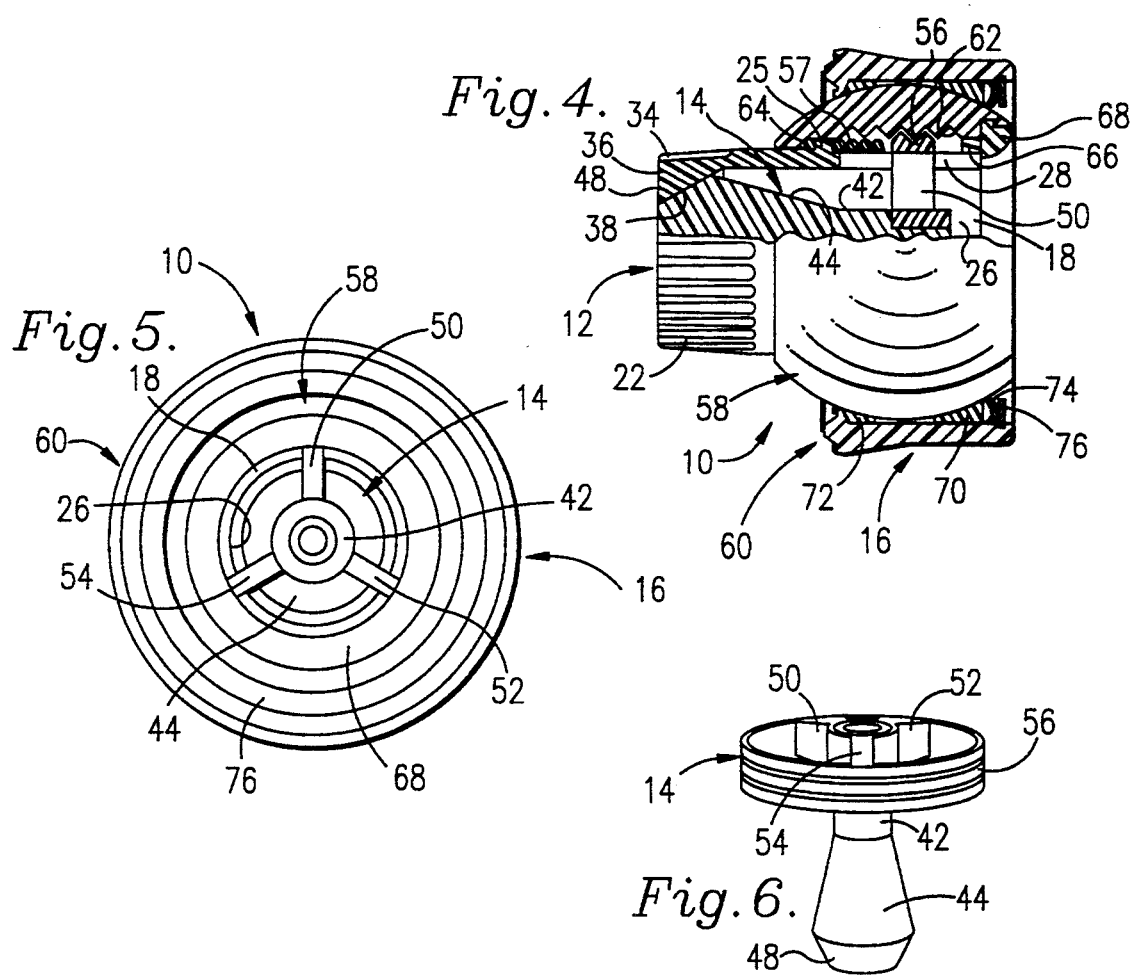
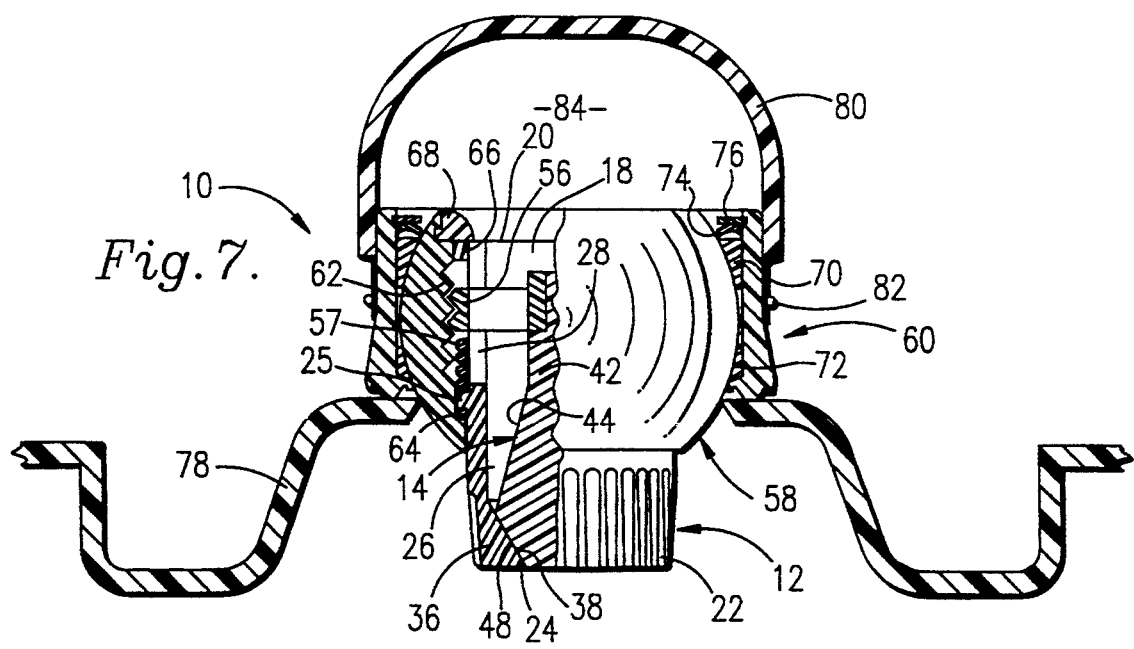

5,399,119

AIR VALVE DEVICE HAVING FLUSH CLOSING NOZZLE

BACKGROUND OF THE INVENTION

1. Field of the Invention

The present invention is broadly concerned with an improved air valve of the type used in passenger aircraft in order to allow passengers to selectively vary both the amount and direction of incoming air. More particularly, it is concerned with such an air valve assembly which presents, when the valve is in the closed position thereof, a fully flattened lowermost end, thereby rendering the valve easier to clean and maintain.

2. Description of the Prior Art

U.S. Pat. No. 2,596,909 describes an air valve adapted for mounting in a vehicle such as an aircraft or the like for controllably admitting ventilation air. Broadly speaking, the valves described in this patent include a frustospherical outer body housing an internal assembly including a tubular valve body with a reciprocal shank member therein. The output end of the valve body is in the form of a diverging, somewhat conical section presenting a knurled outer surface, whereas the shank includes a peaked end section adapted to mate with the inner end of the conical section to close the valve. Valves as described in this patent are deficient in that the lower ends thereof exposed to view and manipulation by users tend to become fouled with dust and dirt. By virtue of the recessed configuration of the output ends of these valves, they are very difficult to effectively clean.

SUMMARY OF THE INVENTION

The present invention overcomes the problems outlined above, and it provides an improved adjustable air valve for use in aircraft or similar contexts which is especially configured for easy cleaning and maintenance. Broadly speaking, the air valve of the invention includes a tubular main body presenting opposed input and output ends, with means supporting the valve body for selective, universal movement thereof in order to vary the direction of air output from the valve body. A shiftable valve member is located at least partially within the valve body and is selectively movable between a valve-closed position blocking air flow through the valve body, and a valve-open position permitting such air flow. In the valve of the invention, the output end of the valve body includes structure defining an apertured, generally flat annular end wall presenting a sealing surface adjacent the aperture. Furthermore, the valve member is especially designed to include an elongated, axially shiftable shank having a flattened end proximal to the end wall aperture, with a sealing surface on the shank adjacent the flattened end. The end wall and shank sealing surfaces are oriented for interengagement when the valve member is shifted to the valve closed position thereof. In this condition, the flattened end of the shank member is substantially flush with the valve body end wall, so that the entire assembly can be readily cleaned and no dirt-collecting recesses or the like are presented.

Advantageously, the shank includes a diverging segment adjacent the lower end thereof, with a circular, reverse-taper sealing surface defining the outer margin of the segment. This reverse-taper sealing surface is adapted to sealingly engage the inner defining surface of the mating valve body in the valve-closed position of the assembly.

BRIEF DESCRIPTION OF THE DRAWINGS

FIG. 4 is a sectional view of the complete valve assembly illustrated in FIG. 1, and with parts broken away to illustrate the internal construction thereof;

FIG. 5 is a plan view of the valve assembly illustrated in FIG. 4;

FIG. 6 is a perspective view of the preferred shiftable valve member forming a part of the overall valve assembly; and FIG. 7 is a sectional view with parts broken away for clarity illustrating the preferred valve assembly mounted for use in a passenger aircraft.

DETAILED DESCRIPTION OF THE PREFERRED EMBODIMENT

Figure 2:
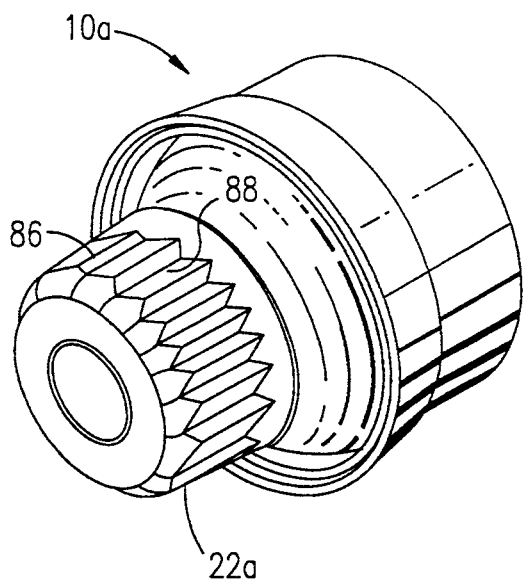
FIG. 2 is a view similar to that of FIG. 1, but depicting a valve body having triangularly-shaped gripping elements thereon.

Turning now to the drawings, and particularly FIGS. 1 and 3–7, a valve assembly 10 is illustrated. Broadly, the valve assembly 10 includes a tubular valve body 12, a shiftable valve member 14 disposed within body 12, and means broadly referred to by the numeral 16 for supporting the valve body for selective movement thereof in order to vary the direction of air output therefrom. In some respects, the valve 10 is similar to the valve described in U.S. Pat. No. 2,596,909, and accordingly this patent is incorporated by reference herein.

In more detail, valve body 12 is of tubular, integral, synthetic resin construction and presents an input end section 18 defining an input opening 20, as well as an output end section 22 defining an output opening 24 and a circumscribing rib 25 generally between the sections 18, 22. The sections 18 and 22 cooperatively define an airflow passageway 26 extending the full length of the body 12. The input end section includes three circumferentially spaced slots 28, 30, 32 which extend from the extreme end of the section 18 to points midway along the length thereof. Output end section 22 presents an outermost gripping surface in the form of a series of elongated recesses 34. In addition, the output end section includes an internal, wedge-shaped in cross-section, inwardly tapered segment 36 having an innermost internal wall surface 38. The segment 36 further presents a flattened annular bottom wall 40 defining the output opening 24.

Valve member 14 is an integral, synthetic resin member and includes an elongated central shank 42 having, adjacent the lower or output end thereof a diverging segment 44 terminating in a flattened bottom wall 46. A reverse-taper sealing surface 48 is provided at the outer margin of the segment 44, and is configured to mate with the lower end of internal surface 38. The upper end of shank 42 includes a total of three circumferentially spaced vanes 50, 52, 54 which support an outermost, externally threaded attachment ring 56.

The valve member 14 is located within valve body 12 as best seen in FIG. 4. Specifically, the vanes 50–54 are respectively received within corresponding input end slots 28-34 so that the valve member 14 is axially shiftable within the outer valve body. A coil spring 57 is disposed between the upper surface of rib 25 and the bottom surface of attachment ring 56. The slots 28-32 and vanes 50-54 are cooperatively arranged so that, when the valve member 14 is at its lowermost position illustrated in FIG. 4, the sealing surface 48 comes into tight inter-engagement with the bottom of internal surface 38.

Figure 3:
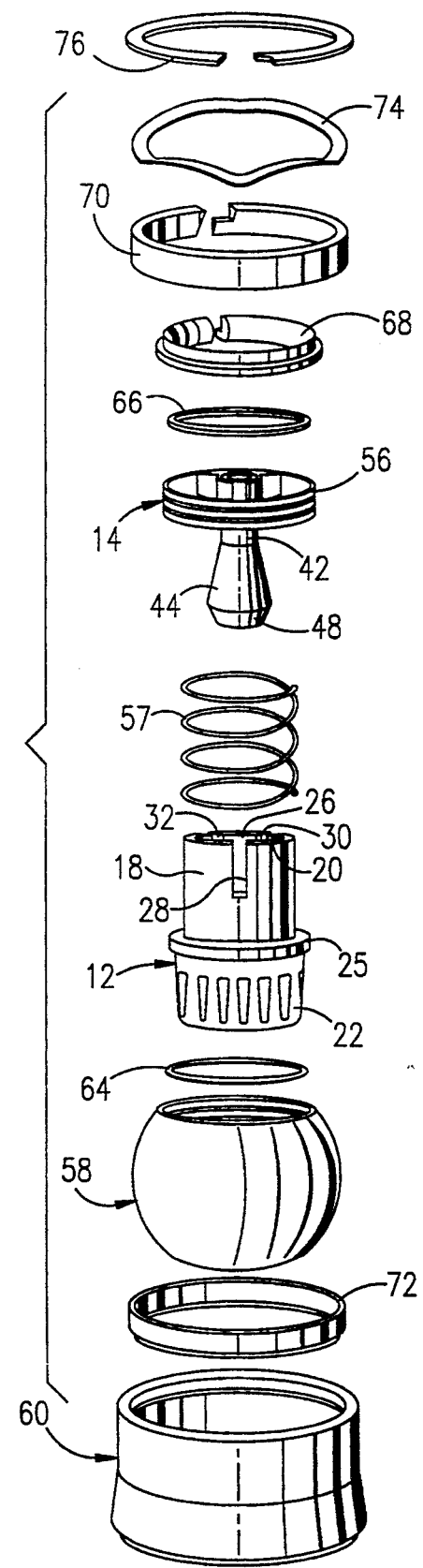
FIG. 3 is an exploded perspective view of the preferred valve assembly.

The supporting means 14 generally includes a frustospherical body 58 for receiving the valve body 12 and member 14, as well as an outermost collar member 60 allowing attachment of the complete assembly 10 within an airplane or the like. As best seen in FIGS. 3 and 4, the frustospherical body 58 is open-ended and is internally threaded as at 62. The input end section 18 of valve body 12, and the upper end of valve member 14, are disposed within body 58 as best seen in FIG. 4. Specifically, it will be observed that the outer threads of attachment ring 56 mate with the internal threading 62 of body 58, so that, upon manual rotation of the valve body 12, the internal valve member 14 is caused to selectively move toward or away from output end 24.

In order to provide appropriate sealing and interconnection between the outer frustospherical body 58 and the internal valve assembly-components, an O-ring 64 is located between the underside of rib 25 and an annular internal mating surface of the body 58; and a flat, synthetic resin ring 66, together with a split resilient attachment ring 68, are attached adjacent the upper end of the body 58 in order to limit the upward movement of valve member 14 therein.

Collar member 60 is configured to captively retain body 58 and the valve assembly therein, in a manner to permit universal shifting movement of the body 58 and the valve assembly. To this end, the collar member 60 is of tubular design and is equipped with a pair of spaced apart, upper and lower annular gaskets 70, 72 respectively located adjacent the open ends of the collar member. The gaskets 70, 72 permit universal shifting and tilting of the frustospherical body 58. The interconnection between the frustospherical body 58 and collar member 60 is completed by means of wave spring 74 and uppermost retaining ring 76. As best seen in FIG. 4, these components are located adjacent the upper end of the collar member 60 and serve to yieldably maintain the body 58 within the confines of the collar member.

FIG. 7 illustrates the complete valve assembly 10 situated in a typical environment of use, namely with collar member 60 installed above a apertured ceiling wall 78, and with the output end section 22 of valve body 12 extending through the ceiling aperture to permit access to the valve. A plenum-defining uppermost housing wall 80 is connected to the upper open end of collar member 16 via spring clips 82. The wall 80 defines an internal air plenum 84 which is operatively connected with a source (not shown) of ventilating air. As illustrated in FIG. 7, the valve assembly 10 is in the closed position thereof, i.e., the sealing surface 48 is in tight interengagement with the bottom margin of internal surface 38.

If it is desired to open the valve assembly 10, it is only necessary to manually grasp the lower section 22 at the region of recesses 34, and rotate the valve body 12 in a counterclockwise direction. This serves to rotate the valve member 14 by virtue of the interengagement between the vanes 50-54 and slots 28-32 and the threaded connection between attachment ring 56 and the internal threading provided on the body 58. Accordingly, the valve member 14 is threaded upwardly until the attachment ring 56 engages the limit ring 66, at which point the valve is fully opened. Of course, reverse rotation of body 12 in a clockwise direction serves to again close the valve assembly. In this orientation, it will readily be seen that air from plenum 84 may pass downwardly through the valve body 12 for ventilation purposes. It will also be apparent that the user may grasp the lower valve body section 22 and pivot the entire valve assembly and surrounding frustospherical body 58 in order to direct the ventilation air as desired.

Figure 1:
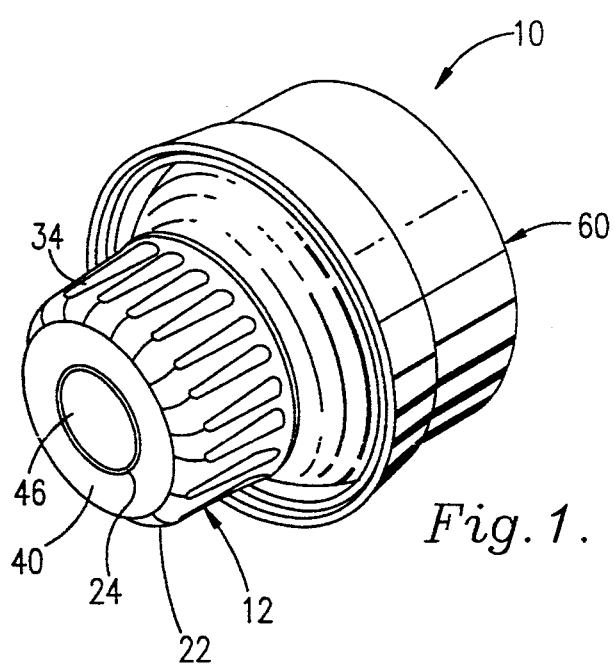
FIG. 1 is a perspective view of a valve assembly in accordance with the invention, wherein the valve body is equipped with a recessed gripping surface.

When the valve assembly 10 is in the FIG. 7 valve-closed position thereof, the valve assumes the orientation of FIG. 1, i.e., the end wall 40 and shank bottom wall 46 cooperatively present a substantially flush and flattened end surface. This surface may be readily cleaned, and resists the tendency to accumulate dust and dirt.

FIG. 2 illustrates a slightly altered embodiment 10a of the invention. This embodiment is identical except that the lower valve body section 22a is provided with a plurality of elongated, somewhat triangular in cross-section gripping members 86 about the periphery thereof, which present a corresponding series of elongated pointed rib members with recesses 88 therebetween.

We claim:

1. In an air valve including a tubular valve body presenting an input end and an output end, means supporting said valve body for selective movement thereof in order to vary the direction of air output from said output end, a shiftable valve member located at least partially within said body and being selectively movable between a valve closed position blocking air flow through the body, and a valve open position permitting air flow through the body, the improvement comprising:

said valve body output end including structure defining an outer wall, a planar, annular end wall transverse to said outer wall, and an inner wall located radially inward of said outer wall and adjacent said end wall, a part of said inner wall defining a sealing surface; and said valve member being supported for shiftable movement relative to said valve body and including an elongated shank having a sealing surface that seats against the valve body sealing surface in the valve-closing position of the valve members, the shank including a planar end surface disposed parallel to said valve body end wall, said end surface being coplanar with the valve body end wall and presenting a substantially continuous flat surface when said valve member sealing surface is seated against the valve body sealing surface.

2. The air valve as set forth in claim 1, said output end including a frustoconically-shaped wedge section, said sealing surface forming a part of the outer defining surface of said wedge section.

3. The air valve as set forth in claim 2, said output end sealing surface terminating in and forming a part of said end wall.

4. The air valve as set forth in claim 1, said valve body including a plurality of slots adjacent said input end, said valve member including a plurality of outwardly extending vanes secured to said shank, each of said vanes being slidably received within an associated slot for shifting movement of the valve member along the length of said valve body.

5. The air valve as set forth in claim 1, said means for supporting said valve body comprising a frustospherical body receiving said valve body therein, and means supporting said frustospherical body for movement thereof.

6. The air valve as set forth in claim 1, said shank including an outwardly diverging segment, the butt end of said segment presenting said planar end surface, said shank sealing surface defining the periphery of said segment adjacent said flattened end.

* * * * *